US012799809B2

(12) United States Patent
Mojica et al.

(10) Patent No.: US 12,799,809 B2
(45) Date of Patent: Nov. 17, 2026

(54) VACUUM SEALING A SACRIFICIAL GLASS PANEL TO A STRUCTURAL GLASS PANEL

(71) Applicants: Manuel Mojica, Las Vegas, NV (US); Micah Jones, Kingman, AZ (US)

(72) Inventors: Manuel Mojica, Las Vegas, NV (US); Micah Jones, Kingman, AZ (US)

( * ) Notice: Subject to any disclaimer, the term of this patent is extended or adjusted under 35 U.S.C. 154(b) by 182 days.

(21) Appl. No.: 19/026,845

(22) Filed: Jan. 17, 2025

(65) Prior Publication Data

US 2025/0154822 A1 May 15, 2025

Related U.S. Application Data

(62) Division of application No. 17/824,296, filed on May 25, 2022, now Pat. No. 12,467,310.

(60) Provisional application No. 63/192,625, filed on May 25, 2021.

(51) Int. Cl.

| | |
|---|---|
| ***E06B 3/673*** | (2006.01) |
| ***E04B 5/46*** | (2006.01) |
| ***E06B 3/66*** | (2006.01) |
| ***E06B 3/663*** | (2006.01) |

(52) U.S. Cl.

CPC ................ *E06B 3/673* (2013.01); *E04B 5/46* (2013.01); *E06B 3/6612* (2013.01); *E06B 3/66342* (2013.01)

(58) Field of Classification Search

CPC ....................................................... E06B 3/673

See application file for complete search history.

(56) References Cited

U.S. PATENT DOCUMENTS

| | | | | |
|---|---|---|---|---|
| 5,005,557 | A * | 4/1991 | Bachli .................... | F24S 80/56 52/786.13 |
| 5,443,877 | A | 8/1995 | Kramer | |
| 6,468,610 | B1 | 10/2002 | Morimoto | |
| 7,694,475 | B2 | 4/2010 | Rae | |

(Continued)

FOREIGN PATENT DOCUMENTS

| | | |
|---|---|---|
| CN | 201933018 | 8/2011 |
| CN | 211054572 | 7/2020 |

(Continued)

*Primary Examiner* — Michael N Orlando
*Assistant Examiner* — John Blades
(74) *Attorney, Agent, or Firm* — McDonald Hopkins LLC; James P. Muraff

(57) ABSTRACT

A method of vacuum sealing a sacrificial panel to a structural panel, such as to form a walkway, is disclosed. The method comprises providing a sacrificial panel having a first side and a second, opposing side, providing a plurality of dots, applying the plurality of dots in a spaced relationship onto the first side of the sacrificial panel, applying a double-sided tape about the periphery of the first side of the sacrificial panel, providing a structural panel, placing the structural panel onto the first side of the sacrificial panel, wherein the dots create a gap between the sacrificial layer and the structural layer, and the double-sided tape provides an airtight seal between the sacrificial layer and the structural layer. The method further comprises providing a needle coupled to a vacuum device, inserting the needle into the gap between the sacrificial layer and the structural layer and operating the vacuum device to remove air from the gap between the sacrificial layer and the structural layer.

11 Claims, 2 Drawing Sheets

(56) References Cited

U.S. PATENT DOCUMENTS

| | | | |
|---|---|---|---|
| 10,286,632 | B2 | 5/2019 | Eckelt |
| 10,294,662 | B1 | 5/2019 | Conklin |
| 10,738,483 | B1 | 8/2020 | O'Keefe |
| 2021/0115676 | A1 | 4/2021 | Rae |

FOREIGN PATENT DOCUMENTS

| | | |
|---|---|---|
| DE | 202006014552 | 12/2006 |
| DE | 10201800641 | 1/2007 |
| GB | 304094 | 5/1928 |
| WO | 201911694 | 1/2019 |

* cited by examiner

VACUUM SEALING A SACRIFICIAL GLASS PANEL TO A STRUCTURAL GLASS PANEL

Walkways formed of clear panels, such as glass, are known. Such walkways may comprise a series of substantially clear panels, supported above ground by one or more beams and may permit people on the walkway to look down, through the glass, to ground below. One such walkway is the Skywalk, located at Grand Canyon West, which extends 70 feet out over the rim of the Grand Canyon, permitting people on the Skyway, to look down approximately 4000 feet, to the floor of the Grand Canyon below.

Overtime, such walkways may become scuffed due to traffic, weather or the like, diminishing the view below. In such instances, it may be desirable to remove the scuffed panels and replace the scuffed panels with new, unscuffed panels. This can be particularly difficult, such as when one is 70 feet out over the rim of the Grand Canyon, 4000 feet above the ground below. And as may be the case, at times the work must be performed at night, so as not to interrupt use of the walkway during the day.

The present disclosure is provided to address this and other problems.

SUMMARY

It is an object to provide a clear panel formed of a clear sacrificial layer, on which people walk, bonded to a clear structural layer. When the sacrificial layer becomes scuffed, it may be removed, in place, from its underlying structural layer, and a new, unscuffed sacrificial layer may be placed onto the underlying structural layer, while the underlying structural panel remains in place.

This and other objectives and advantages may become apparent from the following description taken in conjunction with the accompanying Figures.

DESCRIPTION OF THE PREFERRED EMBODIMENT

While this invention is susceptible of embodiments in many different forms, there will be described herein in detail, a specific embodiment thereof, with the understanding that the present disclosure is to be considered an exemplification of the principles of the invention and is not intended to limit the invention to the specific embodiment illustrated.

Figure 1:
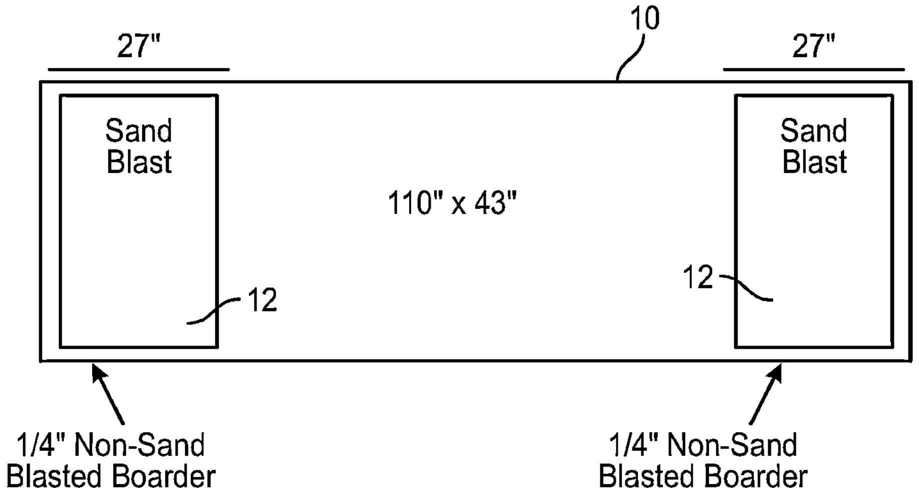
FIG. 1 is an illustration of one embodiment of a sacrificial glass panel in accordance with the present invention, such as for straight segments of a walkway.
Figure 2:
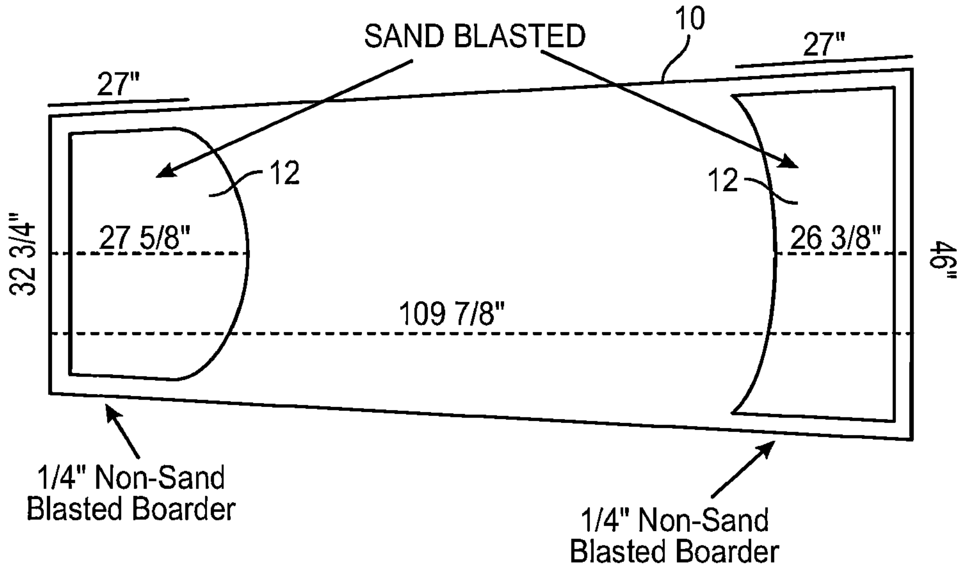
FIG. 2 is an illustration of one embodiment of a sacrificial glass panel in accordance with the present invention, such as for curved segments of a walkway.

In accordance with the present invention, a clear sacrificial panel, generally designated 10, is illustrated in FIGS. 1 and 2. The sacrificial panel 10 may be formed of glass, of an acrylic such as Lucite, or the like. The sacrificial panel 10 may be shaped as needed, such as the rectangular sacrificial panel 10 of FIG. 1, shaped such as for a straight segment of a walkway (not shown), or the generally trapezoidal sacrificial panel 10 of FIG. 2, shaped such as for a curved segment of a walkway (not shown). The sacrificial panel 10 may be five-sixteenths (5⁄16") of an inch in thickness. Other shapes for the sacrificial panel 10 may be utilized as needed.

The following describes a process and for applying and vacuum sealing a sacrificial panel 10 to a structural panel of glass 14 (FIG. 3), such as a multi-layer laminated glass panel. The panel of glass 14 may be a 5⁄16" sheet of tempered glass.

In a first step, a light sand blast may be applied to desired sections (sand blast sections 12) of the sacrificial panel 10, creating a frost appearance. The sandblasted sections 12 may be sections to be aligned with associated beams supporting the walkway, thereby substantially blocking the view of the supporting beams.

Next, the sacrificial panel 10 may be thoroughly cleaned, on the side to subsequently engage the structural panel 14, using a commercial grade window cleaning solution to remove any impurity that may be stuck to the sacrificial panel 10. The structural panel 14 may be similarly, thoroughly cleaned.

Figure 3:
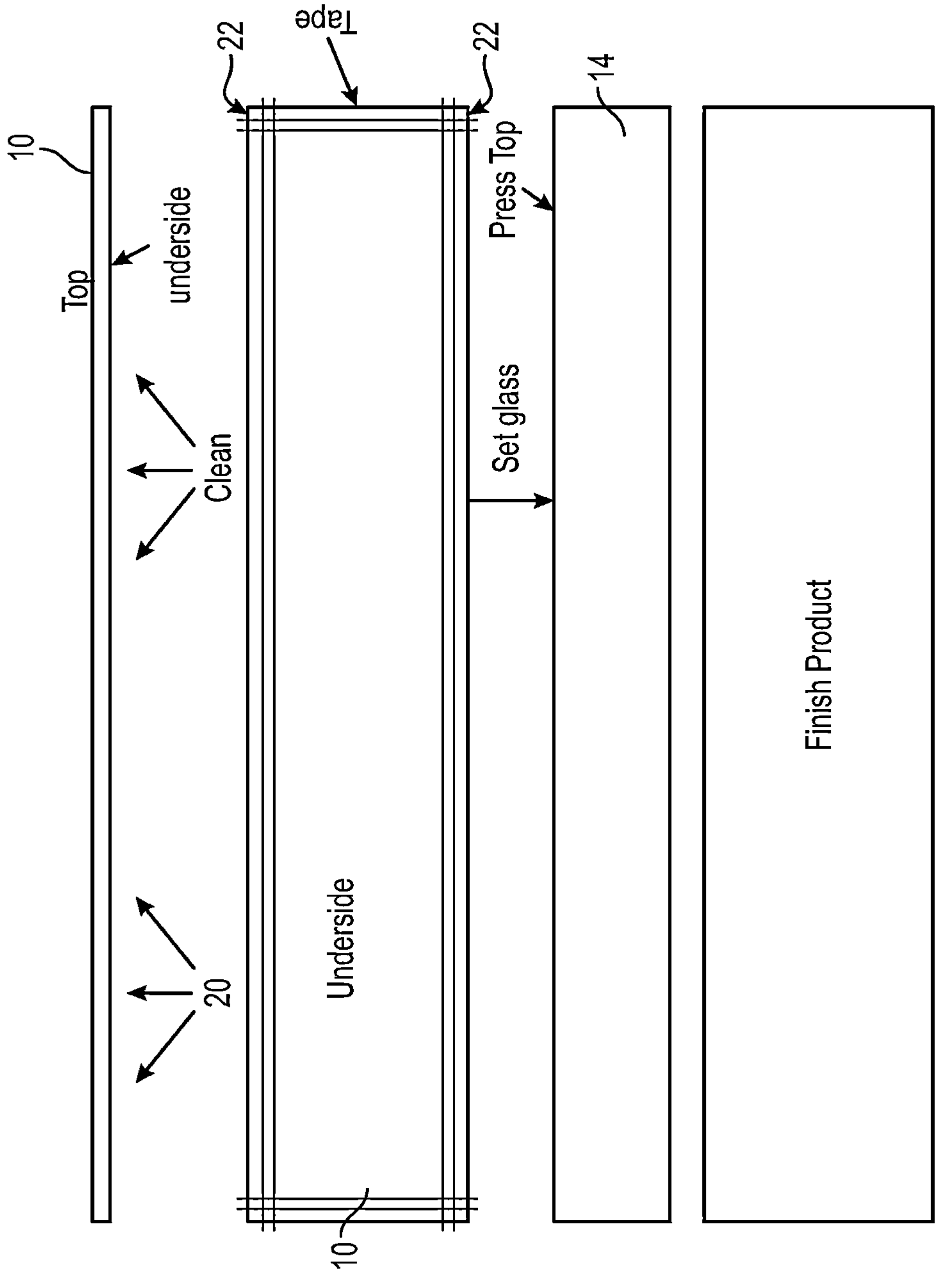
FIG. 3 is an illustration of assembling a sacrificial glass panel onto a structural panel of glass.

Referring to FIG. 3, a clear film (not shown), having a thickness of the order of a sheet of paper, may be placed onto the sacrificial panel 10, on the side of the sacrificial panel to subsequently engage the structural panel 14. The clear film may have a grid of clear dots 20 that have been custom lasered out on a laser plotter. The film may then be removed from the sacrificial panel 10, leaving only the small clear vinyl dots 20, arranged in the grid pattern, to remain on the sacrificial panel 10.

Next, a clear 0.040" thick, ¼" wide, heavy-duty double-sided poly tape 22 may be applied to the sacrificial panel 10, on the side to subsequently engage the structural panel 14. The tape 22 may be put down on all four sides, overlapped on each end. The tape 22 may be placed on the sacrificial panel 10 by hand. A tool (not shown), which may be a plastic spatula or a knife having a relatively broad blade with its end point squared off, may be used to press the tape down onto the sacrificial panel 10.

The sacrificial glass 10 may then be placed onto the structural panel 14. The panels 10 and 14 may then be squeezed together tightly about their periphery, until there is no foggy look to the tape. At this point, an airtight seal between the sacrificial panel 10 and the structural panel 14 has been achieved.

Finally, a needle (not shown), coupled to a vacuum device (not shown) may be inserted between the panels 10, 14, and any air between the panels 10, 14 is removed, drawing the panels 10, 14, closely together into substantially intimate contact, but for the dots 20 acting as very thin spacers therebetween. The air may be evacuated to 12 lbs per sq inch. On this final step, one may ensure that the seal between the panels 10, 14, is completely airtight.

These steps may all be accomplished while the structural panel 16 remains in place, mounted on its respective beam(s).

To remove one of the scuffed sacrificial panels 10, one may just break the seal between the panels 10, 14, such as by using a needle along with a plastic spatula. One may then pull the sacrificial panel 10 away from the structural panel 14.

It is to be understood that this disclosure is not intended to limit the invention to any particular form described, but to the contrary, the invention is intended to include all modifications, alternatives and equivalents falling within the spirit and scope of the invention.

We claim:

1. A walkway formed at least in part by a method of vacuum sealing a sacrificial panel to a structural panel comprising:
  - providing a sacrificial panel having a first side and a second, opposing side;
  - providing a plurality of dots;
  - providing a structural panel having a first side and a second, opposing side;
  - applying the plurality of dots in a spaced relationship onto at least one of the first side of the sacrificial panel or the structural panel;
  - applying a double-sided tape about the periphery of at least one of the first side of the sacrificial panel or the structural panel;
  - placing the first side of one of the sacrificial panel or the structural panel onto the first side of the other of the sacrificial panel or the structural panel, wherein:
    - the dots create a gap between the sacrificial panel and the structural panel; and
    - the double-sided tape provides an airtight seal between the sacrificial panel and the structural panel;
  - providing a needle coupled to a vacuum device;
  - inserting the needle into the gap between the sacrificial panel and the structural panel; and
  - operating the vacuum device to remove air from the gap between the sacrificial panel and the structural panel, drawing the structural panel and the sacrificial panel into substantially intimate contact but for the dots acting as very thin spacers therebetween.

2. The walkway of claim 1, wherein the sacrificial layer and the structural layer are substantial clear.

3. The walkway of claim 1, wherein the dots are formed in a grid pattern.

4. The walkway of claim 3, wherein the dots are custom lasered out on a laser plotter.

5. The walkway of claim 1, wherein the sacrificial panel is formed of glass.

6. The walkway of claim 1, wherein the sacrificial panel is formed of an acrylic.

7. The walkway of claim 1, wherein the structural panel is formed of glass.

8. The walkway of claim 1, wherein the walkway is adapted to be supported by a beam, and the sacrificial panel is sandblasted to form a frosted appearance, to be aligned with the beam.

9. A walkway formed at least in part by a method of vacuum sealing a sacrificial panel to a structural panel, comprising:
  - providing a sacrificial panel having a first side and a second, opposing side;
  - providing a film, the film having a plurality of dots lasered therethrough;
  - providing a structural panel having a first side and a second, opposing side;
  - applying the film onto at least one of the first side of the sacrificial panel or the structural panel;
  - removing the film from the sacrificial panel, leaving the dots on at least one of the first side of the sacrificial panel or the structural panel;
  - applying a double-sided tape about the periphery of at least one of the first side of the sacrificial panel or the structural panel;
  - placing the first side of one of the sacrificial panel or the structural panel onto the first side of the other of the sacrificial panel or the structural panel, wherein:
    - the dots create a gap between the sacrificial panel and the structural panel; and
    - the double-sided tape provides an airtight seal between the sacrificial panel and the structural panel;
  - providing a needle coupled to a vacuum device;
  - inserting the needle into the gap between the sacrificial panel and the structural panel; and
  - operating the vacuum device to remove air from the gap between the sacrificial panel and the structural panel, drawing the structural panel and the sacrificial panel into substantially intimate contact but for the dots acting as very thin spacers therebetween.

10. The walkway of claim 9, wherein the sacrificial layer and the structural layer are substantial clear.

11. The walkway of claim 9, wherein the dots are formed in a grid pattern.

* * * * *